United States Patent

[11] 3,621,971

| [72] | Inventors | Curtice F. Daniels, Sr.<br>S-203 Pacific Ave., Glendale, Oreg. 97442;<br>Curtice F. Daniels, Jr., 1311 N.W.<br>Hawthorne, Grants Pass, Oreg. 95564 |
|---|---|---|
| [21] | Appl. No. | 820,903 |
| [22] | Filed | May 1, 1969 |
| [45] | Patented | Nov. 23, 1971 |

[54] CROSS CONVEYOR FOR WOOD-PROCESSING SYSTEM
10 Claims, 6 Drawing Figs.

[52] U.S. Cl.................................................. 198/21, 198/32
[51] Int. Cl..................................................B65g 47/26, B65g 47/42
[50] Field of Search........................................ 198/21, 27, 32; 214/1 S, 1 SWB; 271/DIG. 4

[56] References Cited
UNITED STATES PATENTS

| 3,108,677 | 10/1963 | Temple ........................ | 198/21 |
| 3,194,380 | 7/1965 | Watson ........................ | 198/21 |
| 2,229,638 | 1/1941 | Chamberlin.................... | 209/71 (2 X) |
| 2,261,972 | 11/1941 | Matthews...................... | 34/162 X |
| 2,558,338 | 6/1951 | Clements...................... | 198/27 X |
| 2,672,931 | 3/1954 | Maher.......................... | 198/32 X |
| 3,375,941 | 4/1968 | Repper......................... | 198/27 X |

FOREIGN PATENTS

| 1,142,619 | 4/1957 | France ......................... | 198/27 |

*Primary Examiner*—Edward A. Sroka
*Attorney*—Buckhorn, Blore, Klarquist and Sparkman

ABSTRACT: A cross conveyor for conveying strips of material along a path which is transverse to the path along which the strips are delivered to the cross conveyor. The cross conveyor includes a series of parallel but laterally spaced endless conveyor sections alternating with stationary but vertically movable material-support sections. The stationary sections support the strips of material out of contact with the conveyor sections when the strips are first fed to the cross conveyor, but thereafter drop below the level of the conveyor sections to deposit the strips on the conveyor sections without skewing the strips from their prior orientation when delivered to the cross conveyor. The cross conveyor is incorporated in a wood-veneer-processing system including a multideck veneer conveyor-dryer and automatic sequential unloader upstream therefrom, and a sorting conveyor table including automatic stacking apparatus downstream from the cross conveyor.

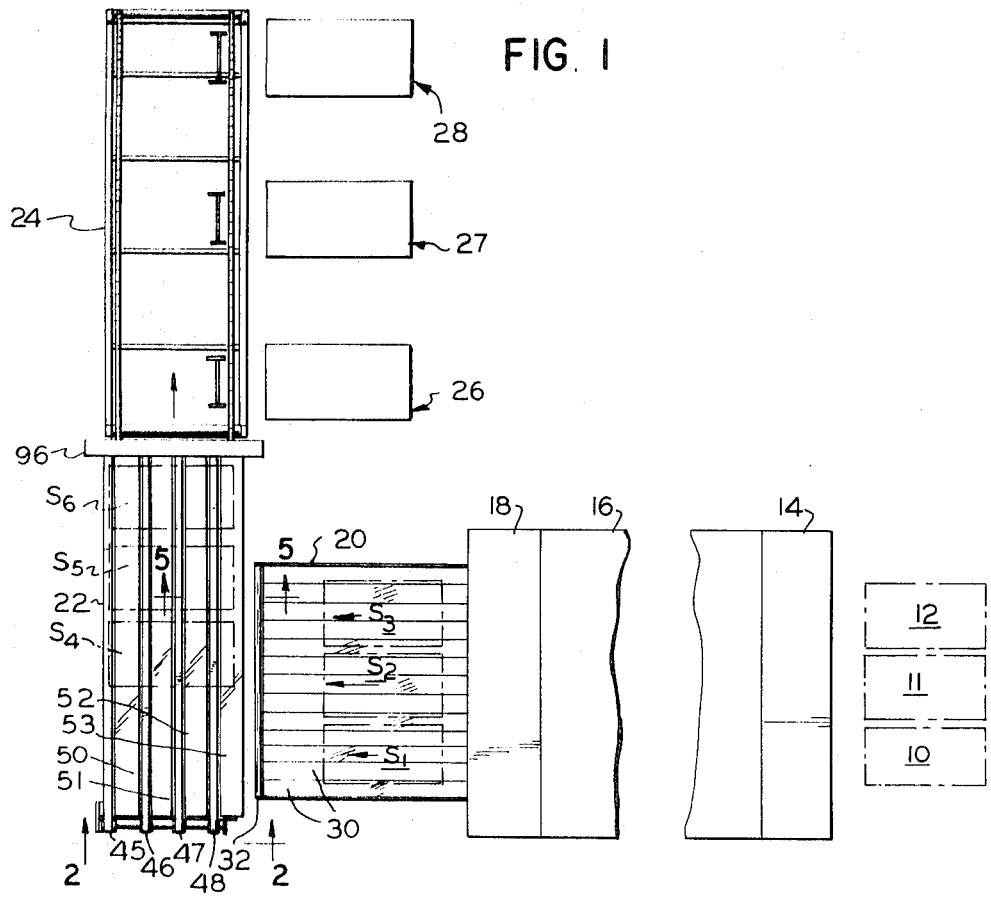
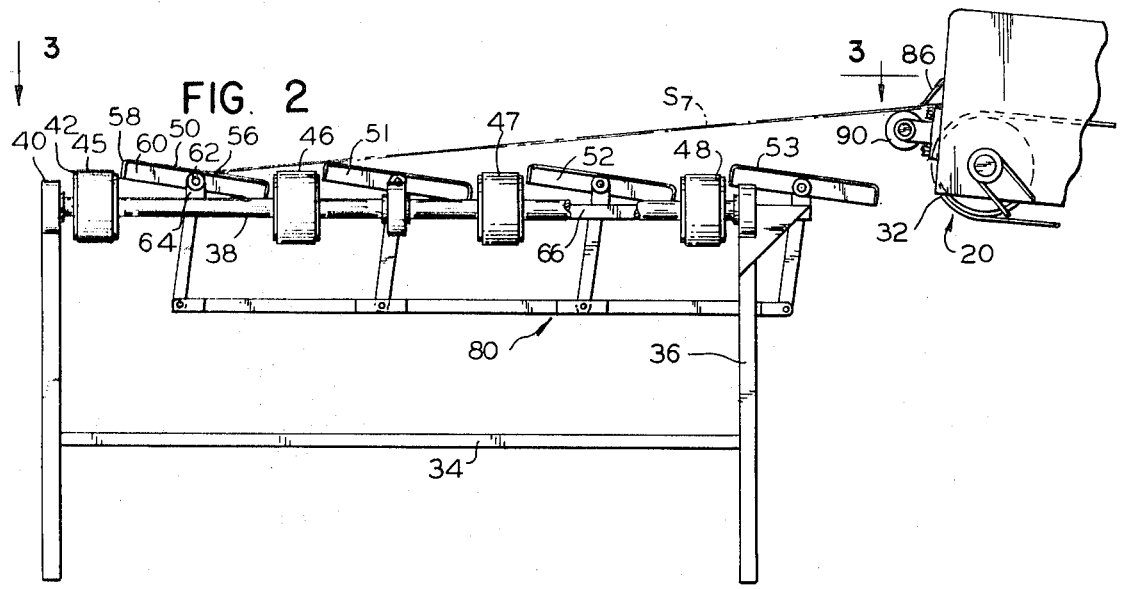

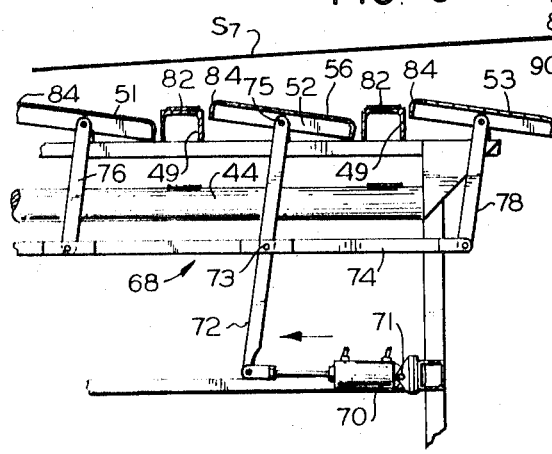
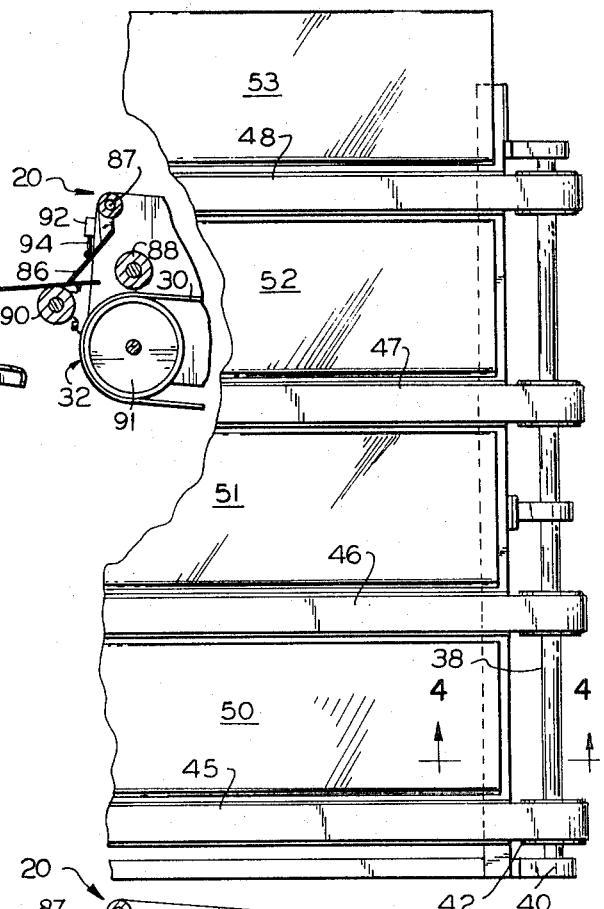
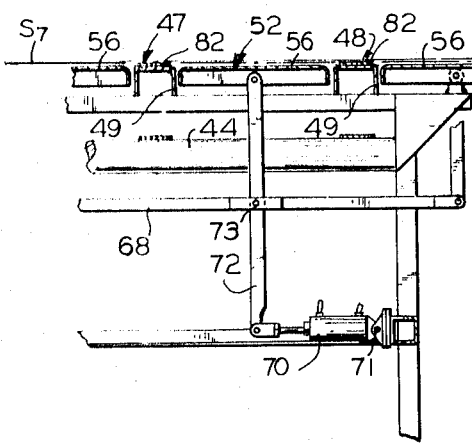
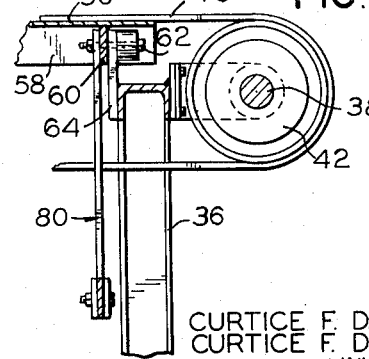

CROSS CONVEYOR FOR WOOD-PROCESSING SYSTEM

BACKGROUND OF THE INVENTION

1. Field of the Invention

The present invention relates to a conveyor and more particularly to a cross conveyor for conveying strip or sheet material in a direction transverse to a preceding direction of travel without changing the orientation of the material during its delivery to the cross conveyor.

2. Description of the Prior Art

Prior known conveyor systems which have included a cross conveyor for conveying material in a direction normal to the path of travel of a preceding conveyor have commonly included a material-supporting surface consisting entirely of moving conveyor elements. Consequently, during the transfer of a strip of lumber or wood veneer from one conveyor to a cross conveyor, the leading end of the strip would reach the cross conveyor first and thus come under the immediate influence of the cross conveyor while the rearward portions of the strip would still be under the influence of the first conveyor, causing the strip to become skewed on the cross conveyor with respect to its initial orientation and with respect to the path of travel of the cross conveyor.

Skewing of certain types of material in certain processing systems is undesirable, and particularly in automatic processing systems. For example, in a plywood-veneer-sheet-processing operation disclosed herein, where it is desired to dry, sort and stack the veneer sheets in a continuous automatic operation, the sheets must be delivered by conveyor from the dryer to the sorting and stacking equipment without overlapping successive sheets and with the sheets in a predetermined uniform orientation for proper functioning of such equipment, such orientation usually being with one set of edges of the sheets extending normal to the conveyor path. The usual cross conveyor of the prior art is therefore unsuitable for use in such automatic processing systems and in many other material-handling applications.

SUMMARY OF THE INVENTION

In accordance with the present invention, the foregoing problems of the prior art are overcome by providing a cross conveyor which does not act to convey strip material fed laterally to it until the material has become fully supported on the cross conveyor, thereby preventing skewing of the material during a change in its direction of travel. This result is accomplished by providing the cross conveyor with stationary material support surfaces which support the strip material fed to it above the level of the conveying surfaces of such conveyor until the strip material is fully supported on such stationary surfaces. Then the stationary support surfaces recede below the level of the conveying surfaces, whereby all conveyor-supported portions of the material become simultaneously supported on the conveying surfaces to prevent skewing of the material during its transition from one path of travel to a normal path of travel. In one application of the invention, the cross conveyor is incorporated in a wood-veneer-sheet-processing system including a multideck dryer-conveyor and automatic sequential unloader for the dryer upstream from the cross conveyor, and automatic sorting and stacking equipment downstream therefrom, thus enabling the continuous automatic drying, conveying, sorting and stacking of multiple wood strips in rapid succession and within a small plant area.

BRIEF DESCRIPTION OF THE DRAWINGS

The foregoing and other objects and advantages of the present invention will become more apparent from the following detailed description which proceeds with reference to the following drawings wherein:

FIG. 1 is a schematic plan view of a continuous automatic veneer-sheet-processing system incorporating a cross conveyor in accordance with the present invention;

FIG. 2 is an end elevational view of the cross conveyor of FIG. 1 on an enlarged scale as viewed along the line 2—2 of FIG. 1;

FIG. 3 is a fragmentary top plan view of the cross conveyor taken along the line 3—3 of FIG. 2, on approximately the same scale as FIG. 2;

FIG. 4 is a vertical sectional view taken along the line 4—4 of FIG. 3 on approximately the same scale as FIG. 3;

FIG. 5 is a vertical sectional view taken along the line 5—5 of FIG. 1 on a scale greatly enlarged from that of FIG. 1;

FIG. 6 is a view similar to FIG. 5 but illustrating the conveyor in its conveying condition.

DETAILED DESCRIPTION

General System

With reference to the drawings, FIG. 1 discloses an automatic plywood-veneer-sheet-processing system including stacks 10, 11 and 12 of green veneer to be processed, an automatic sheet-feeding apparatus 14, a multideck veneer dryer 16, an automatic sequential unloader 18, a single deck outfeed conveyor 20, a cross conveyor table 22, and a sorting conveyor table 24. Positioned alongside the sorting conveyor 24 are a series of automatic veneer sheet stackers 26, 27, 28.

A suitable sorting system and stacking apparatus for use in the overall system shown are disclosed more fully in U.S. Pat. No. 3,334,895. The automatic sheet feeder 14 may be any one of several well-known types such as the feeder shown in U.S. Pat. Nos. 3,061,065, 3,011,619, or 2,876,009.

Multiple deck dryers of the type indicated generally at 16 are well known in the industry. A sequential unloader of the type shown at 18 is disclosed in detail in, for example, U.S. Pat. No. 3,124,233.

Outfeed conveyor 20 is typically a single-deck conveyor composed of a series of endless continuously traveling belts 30, with the infeed end of the conveyor being at a level at or just below the level of the lowermost deck of unloader 18 and then being inclined slightly upwardly so that its discharge end 32 is just slightly above the level of the infeed end of cross conveyor 22. The coordination of the timing of the feeder 14 and unloader 18 is disclosed and explained in our copending application, Ser. No. 825,627, entitled Unloader Control for Sheet-Conveying Apparatus, and filed May 19, 1969. These units are coordinated so that material is charged into the dryer and discharged therefrom in continuous series of sheets without any overlapping and yet with a minimum gap between successive sheets for maximum production. A series of three such sheets S1, S2 and S3 is shown in FIG. 1 approaching cross conveyor 22 on outfeed conveyor 20 as a second series of sheets S4, S5 and S6 move laterally of the outfeed conveyor on cross conveyor 22. Cross conveyor 22 is specially designed so that it does not skew the sheets as they are transferred from outfeed conveyor to the cross conveyor so that the sheets can be handled efficiently by the sorting conveyor 24 and its associated stackers.

CROSS CONVEYOR

With reference to FIG. 2, cross conveyor 22 comprises an upstanding, generally rectangular frame structure 34 including supporting legs 36. The frame rotatably supports at its opposite ends cross shafts 38 in bearing members 40. Each shaft 38 supports a series of pulleys 42 in spaced relationship along the shafts. A series of endless conveyor belts 45, 46, 47, 48 are trained about these sets of pulleys for supporting and conveying strip materials fed longitudinally of the conveyor frame. The upper flight of each belt is supported intermediate its opposite ends by an inverted channel-shaped frame element 49 as shown in FIGS. 5 and 6. The lower flight of each belt is supported at intervals between its opposite ends of a cylindrical cross frame member 44.

One of shafts 38 is suitably driven by a motor means (not shown) to drive the four conveyor elements in a uniform direction for conveying material lengthwise of the cross conveyor in the direction indicated by the arrow in FIG. 1. Such motor may be suitably geared to operate the belts at speeds coordinated with the speeds of the other components of the system shown in FIG. 1 so as to provide a continuous flow of sheet material to the downstream sorting and stacking stations without overlapping or excessive spacing between successive sheets.

Sheet-support means are provided for supporting sheets temporarily on the cross conveyor without longitudinal movement on the belts. Such means includes a series of four longitudinally extending sheet support sections 50, 51, 52, 53. One of these sections is positioned between each adjacent pair of conveyor belts 45, 46, 47 and 48 in a manner so that the belts and sheet support sections alternate across the width of the conveyor and together define the upper surfaces of the conveyor table structure. As shown best in FIGS. 2 and 4, each sheet support section, for example support 50, is a stationary elongate member having a smooth, flat sheet-supporting upper surface 56 with downturned side edges 58 and with rigidifying ribs 60 provided at spaced intervals along its length. Each support member is pivoted by a pin 62 on an ear 64 fixed to a cross frame member 66 for tilting movement about the axis of pin 62 which extends longitudinally of the conveyor.

With reference to FIGS. 5 and 6, all four support members 50, 51, 52, 53 are tilted in unison through a parallel linkage 68 by an extensible double-acting fluid power cylinder 70 pivoted to the frame at 71. Parallel linkage 68 includes an actuating arm 72 pivoted at its lower end to the piston rod of cylinder 70 and pivoted between its upper and lower ends at 73 to a horizontal connecting link 74. The upper end of actuating arm 72 is fixed to support member 52 at its pivot point with respect to pin 75 so that both the arm and support can pivot together about the axis of the pin. Transverse connecting link 74 is pivoted at intervals along its length to various other generally upright parallel actuating links 76, 78 which are in turn connected to their respective support members in the same manner as arm 72. The powered parallel linkage 68 is duplicated at the opposite ends of the conveyor table as shown, for example, by the parallel linkage indicated generally at 80 in FIG. 2. These additional sets of parallel linkage are not powered and are not operatively connected to the powered linkage 68 but serve only to tie the various stationary support members 50, 51, 52 and 53 together to ensure that such members will tilt in unison throughout their lengths.

As shown in FIGS. 5 and 6, the pivots about which each support member tilts are positioned so that material-supporting surface 56 of each support member lies wholly below the elevation of the supporting surface portions 82 of the various conveyor belts when the support members are horizontal and so that an edge portion 84 of each support member will lie above the elevation of surface 82 of the conveyor belts when the stationary supports are tilted upwardly by cylinder 70. Thus in the tilted positions of the stationary supports a sheet S7 is supported in a stationary condition on the conveyor table above the belts. However, when the stationary supports are pivoted to their horizontal positions as shown in FIG. 6, the sheet S7 is lowered onto the continuously moving belts and conveyed downstream on the conveyor table.

The tilt cylinder 70 is triggered by an activating means at the discharge end 32 of outfeed conveyor 20. Such means includes a normally downwardly directed gate 86 mounted for upwardly swinging movement on a shaft 87. In its normal, generally vertical position, the gate blocks the path of sheet material conveyed along the belts 30 at the discharge end of outfeed conveyor 20. Such discharge end also includes sheet guide rollers 88, 90 positioned adjacent to belts 30 and belt pulleys 91 for guiding strips of material from the outfeed conveyor generally horizontally toward the cross conveyor in a path normal to the path of travel of the cross conveyor. Such discharge end also includes a limit switch 92 which has an actuating arm 94. Arm 94 when actuated operates limit switch 92 to extend tilt cylinder 70. Cylinder 70 remains extended so long as arm 94 remains actuated. Actuating arm 94 is positioned so that it is pivoted outwardly to actuate the limit switch by the upward swinging movement of gate 86. Gate 86 is swung upwardly by sheet material passing across the discharge end of outfeed conveyor 20 toward the cross conveyor.

OPERATION

When sheet or strip material is conveyed on belts 30 of outfeed conveyor 22 to the discharge end 32, the leading end of such material strikes gate 86 and swings it upwardly to move arm 94 of limit switch 92 outwardly to actuate the switch. When actuated, switch 92 operates to extend cylinder 70, as, for example, by means of a solenoid-actuated valve in the cylinder's fluid circuit (not shown). When actuated, cylinder 70 tilts the stationary supports upwardly from their normally horizontal positions to receive and support each sheet 57 discharged onto the cross conveyor. Gate 86 is held by the sheet material in its upwardly swung position against arm 94 of the limit switch until the trailing end of sheet 57 clears the gate. When this happens, the gate swings downwardly to release arm 94 of the limit switch and thereby retract cylinder 70, returning the stationary supports to their normally horizontal positions and lowering sheet 57 onto the moving conveyor belts 45, 46, 47, 48. From the foregoing, it will be apparent that sheets discharged by outfeed conveyor 20 will not begin their cross travel on cross conveyor 22 until such sheets become fully supported on the cross conveyor, thereby preventing skewing of the sheet from its normal disposition with respect to the direction of travel of the cross conveyor.

As will be evident from FIG. 1 and the foregoing described structure and operation of the cross conveyor, several sheets at a time, such as the three side-by-side sheets S1, S2, S3 deposited on outfeed conveyor 20 by unloader 18 from one deck of multideck dryer 16, can be discharged onto cross conveyor 22 simultaneously and then conveyed laterally in alignment to the sorting and stacking apparatus while their side and end spaced edges are maintained in parallel or normal relationship with the conveyor path. The speed of conveyor belts 45, 46, 47 and 48 is regulated so that sheets S4, S5, S6 previously deposited on the cross conveyor clear the infeed end thereof before the next series of sheets S1, S2, S3 are received by the cross conveyor.

At the conjunction of the cross conveyor with sorting conveyor 24, an automatic moisture detector 96 may be provided to determine which sheets, if any, should be redryed. The sorting conveyor can also be operated at a faster speed than the cross conveyor to increase the gap between successive sheets to facilitate the sorting operation. The stacking operation may be either automatic as previously indicated or manual. In stacking automatically, an operator positioned near the moisture detector 96 would determine by the press of a button on a suitable control panel (not shown) into which of the three stackers each sheet passing by him should be deposited. Alternatively, the sorter could make the same determination by shifting the sheets laterally on the sorting conveyor to different positions for contact with a selected limit switch which would operate an associate stacker, in the manner disclosed in previously referred to U.S. Pat. No. 3,334,895.

Alternative positioning means could be provided for determining the relative vertical positions of the sheet-supporting surfaces of the belt conveyors and stationary sheet supports. For example, the stationary supports could be maintained in a horizontal disposition and then shifted bodily vertically above and below the elevation of the belt conveyors to provide the differential elevation necessary to hold the sheets temporarily out of contact with the belts. Alternatively, the belts themselves could be shifted vertically to provide the differential elevation between such belts and the stationary supports.

The cross conveyor can be used advantageously to convey without skewing all sorts of sheet and strip materials including lumber and panels of various shapes and dimensions.

It will be appreciated that numerous modifications, equivalents and changes will occur to those skilled in the art, and that the embodiments and applications disclosed above are merely illustrative of the principles of our invention. Accordingly, our intention is not to limit this invention to the exact construction, operation and application as shown and described but to include all such modifications, applications and equivalents within the scope of our invention.

We claim:

1. A cross conveyor apparatus comprising:
   conveying means for conveying material supported thereon along a generally horizontal conveyor path,
   support means positioned horizontally adjacent said conveying means for stationary support of said material to be conveyed,
   positioning means for effecting relative vertical shifting movement of said support means and said conveying means from a first material-holding position to a second material-conveying position,
   said support means being positioned at a level above the level of said conveying means in said first material-holding position and being positioned at a level below the level of said conveying means in said second material-conveying position,
   said support means including a flat material-confronting surface elongated in the direction of said conveyor path and mounted for tilting movement about an axis extending along said conveyor path, said positioning means being operable to tilt said surface about said axis from a first horizontal position wherein said surface lies wholly below the level of material-supporting portions of said conveying means to a second tilted position wherein at least portions of said surface lie at a level above said portions of said conveying means.

2. Apparatus according to claim 1 wherein said support means includes a plurality of tilting elements each including said material-confronting surface, one of said tilting elements being positioned laterally on each of the opposite sides of one of said conveying means.

3. Apparatus according to claim 1 wherein said support means includes a plurality of laterally spaced elongate support strips extending lengthwise along said conveyor path, said conveying means including a plurality of endless conveying elements, there being a support strip positioned along each of the laterally opposite sides of at least one of said conveying elements, said elongate support strips including support portions movable vertically simultaneously relative to said conveying elements between said first and second positions.

4. Apparatus according to claim 3 wherein said support means includes at least two support strips and said conveyor means includes at least two conveyor elements, said support strips and said conveyor elements being positioned in alternating relationship across the width of said conveyor path.

5. A cross conveyor apparatus according to claim 1 comprising:
   an upstream conveyor means,
   a downstream cross conveyor means positioned for receiving material from a discharge end of said upstream conveyor means and conveying said material generally horizontally along a cross conveyor path generally normal to the generally horizontal path of said upstream conveyor means,
   said downstream conveyor means including said conveying means for conveying material along said cross conveyor path and said support means,
   means for activating said positioning means to shift said support means and said conveying means relative to one another between said first and second positions including sensing means positioned adjacent the discharge end of said upstream conveyor means for sensing the trailing edge of material as it is discharged from said upstream conveyor means toward said cross conveyor means,
   said sensing means being operable to activate said positioning means in a direction for effecting relative shifting movement of said support and conveying means to said second position in response to the sensing of said trailing edge.

6. A cross conveyor apparatus comprising:
   conveying means for conveying material supported thereon along a generally horizontal conveyor path,
   support means positioned horizontally adjacent said conveying means for stationary support of said material to be conveyed,
   positioning means for effecting relative vertical shifting movement of said support means and said conveying means from a first material-holding position to a second material-conveying position,
   said support means being positioned at a level above the level of said conveying means in said first material-holding position and being positioned at a level below the level of said conveying means in said second material-conveying position,
   said conveying means including a series of endless conveyor elements laterally spaced from one another across the conveyor path, said support means including a series of platelike support sections spaced from one another across the width of said conveyor path and positioned between adjacent pairs of said endless conveyor elements.

7. Apparatus according to claim 6 wherein said support sections are mounted for tilting movement about pivot axes extending along said conveyor path, said positioning means including parallel linkage means interconnecting said support sections for tilting said sections about their respective pivot axes in unison, said positioning means including means for actuating said parallel linkage means from a first position wherein said support sections have material-supporting surface portions extending above the elevation of said conveyor elements to a second position wherein said sections are disposed generally horizontally wholly below the elevation of material-supporting portions of said conveyor elements.

8. Apparatus according to claim 6 including upstream conveyor means having a discharge end laterally adjacent said cross conveyor in a position for feeding material across said conveyor elements and support sections, said positioning means including means for tilting said support sections about tilt axes extending along said conveyor path from said second position wherein said support sections lie wholly beneath material-supporting surfaces of said conveyor elements to said first position wherein at least an edge portion of said sections lie above said surfaces of said conveyor elements and in a direction such that the uppermost edges of said plate sections in said first position are further from said upstream conveyor means than the lowermost edges thereof.

9. A cross conveyor apparatus for thin sheet material such as sheets of wood veneer comprising:
   a cross conveyor table including,
   continuously driven conveying means for conveying material supported thereon along a generally horizontal conveyor path,
   support means positioned horizontally adjacent said conveying means for stationary support of said material to be conveyed,
   positioning means for effecting relative vertical shifting movement of said support means and said conveying means from a first material-holding position to a second material-conveying position,
   said support means being positioned at a level above the level of said conveying means and arranged to support said material in a generally horizontal disposition in said first material-holding position and being positioned at a level below the level of said conveying means in said second material-conveying position,
   a continuously driven upstream conveyor means having a flow path normal to the path of said cross conveyor table and having its downstream end juxtaposed to said cross conveyor table without any intervening bridging conveyor means,
   both said conveying means and said support means being supported on said cross conveyor table at a level substantially below the level of the discharge end of said upstream conveyor means in both their first and second positions,
   power means for actuating said positioning means,
   and sensing means operable by said sheet material to activate said power means for relative vertical shifting movement of said support means and conveying means to said first position before the delivery of each new sheet or series of sheets laterally to said cross conveyor table from said upstream conveyor means and to said second position when said new sheets are received on said cross conveyor table, the vertical distance between the discharge end of said upstream conveyor means and the upper surfaces of said cross conveyor table, and the speed of said upstream conveyor means being such that sheets are lofted from said upstream conveyor means onto said cross conveyor table.

10. Apparatus according to claim 9 wherein said cross conveyor table and said upstream conveyor means are adapted for handling simultaneously multiple strips of wood side by side in that said support means extends lengthwise along said conveyor table through a distance at least as great as the width of said upstream conveyor means at a position spanning said width.

* * * * *